United States Patent [19]

Belsky et al.

[11] 4,441,731

[45] Apr. 10, 1984

[54] TOWING SYSTEM FOR VEHICLES WITH REAR BUMPERS

[76] Inventors: Jerome Belsky, 44 Strawberry La., Rolling Hills Estates, Calif. 90724; Don M. Belsky, 5427 Vista Fortuna, Cypress, Calif. 90630

[21] Appl. No.: 346,861

[22] Filed: Feb. 8, 1982

[51] Int. Cl.³ .............................................. B60D 1/00
[52] U.S. Cl. ................................. 280/495; 280/490 R; 280/502; 403/378
[58] Field of Search ....................... 280/495, 496–502, 280/490 R, 492, 504–508; 403/378, 379

[56] References Cited

U.S. PATENT DOCUMENTS

| | | | |
|---|---|---|---|
| 2,685,468 | 8/1954 | Blocker et al. | 403/354 X |
| 2,747,892 | 5/1956 | Jones | 280/495 X |
| 3,552,775 | 1/1971 | Warner | 280/492 |
| 4,050,714 | 9/1977 | Epp | 280/495 |

Primary Examiner—Joseph F. Peters, Jr.
Assistant Examiner—Mitchell J. Hill
Attorney, Agent, or Firm—Ben E. Lofstedt

[57] ABSTRACT

A towing system for vehicles with rear bumpers, including an anchor plate mounted to the underside of the rear bumper, a bracket secured to the anchor plate with a channel therein and a pair of laterally disposed flanges projecting from the top edges of the channel, a tongue arranged to be slideably mated to the bracket and mounted in the channel portion thereof so as to dispose one end of the tongue rearwardly of the bumper, an end plate welded to the end of the tongue projecting rearwardly of the bumper, the end plate having a lip portion disposed above the end of the bracket in intimate abutment with the rearward edge of the anchor plate, and a ball hitch mount welded to the end plate for mounting a ball hitch thereto for towing a vehicle.

10 Claims, 3 Drawing Figures

U.S. Patent
Apr. 10, 1984
4,441,731
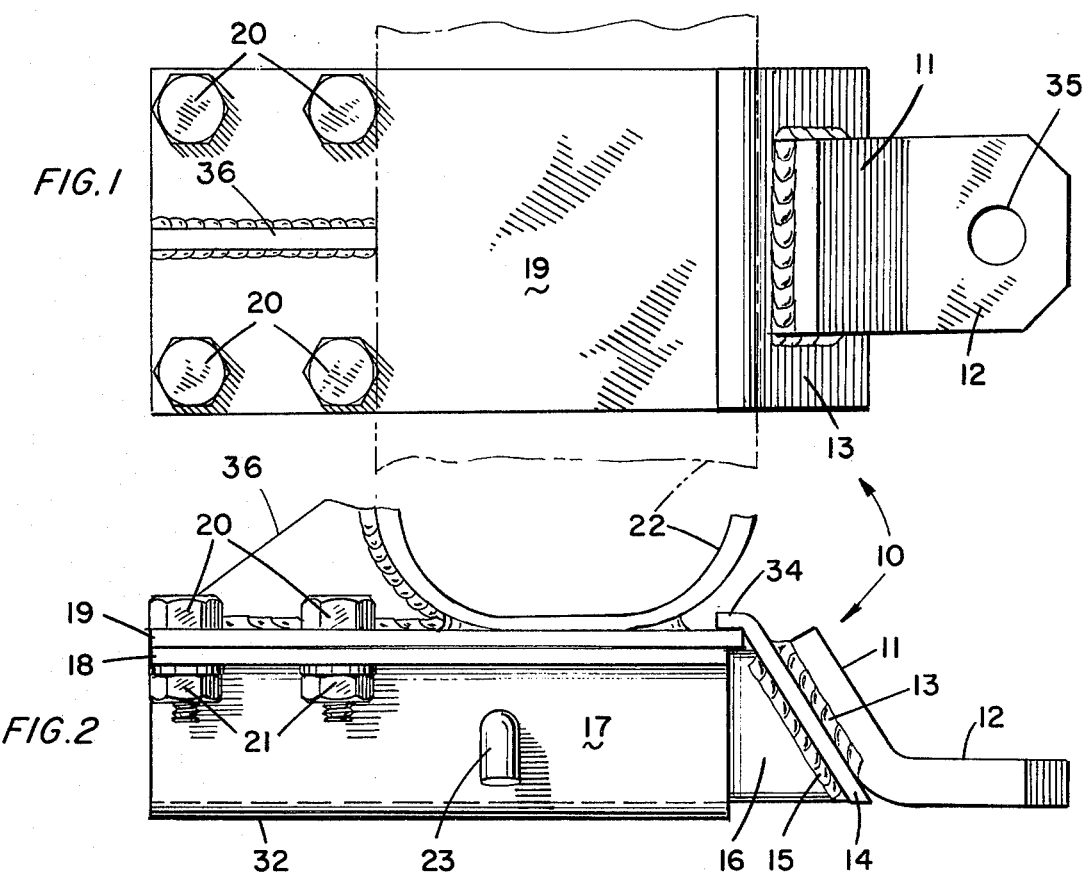
FIG.1
FIG.2
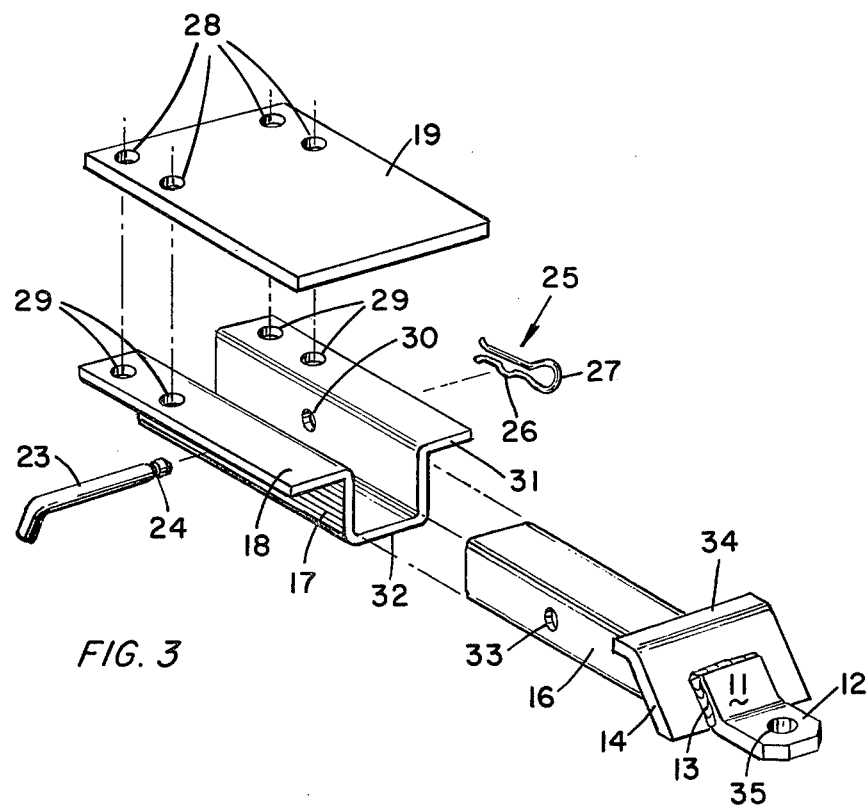
FIG.3

TOWING SYSTEM FOR VEHICLES WITH REAR BUMPERS

BACKGROUND OF THE INVENTION

1. Field of the Invention

The present invention relates to a towing system for vehicles with rear bumpers, and more particularly, relates to vehicles with tubular bumpers.

2. Description of the Prior Art

The prior art is replete with various combinations of towing apparatus for vehicles relative to non-tubular rear bumpers. Simply applying the systems which were available in the prior art to be used with non-tubular bumpers resulted in failure of the towing system and produced an undesirable appearing installation.

In order to meet the energy requirements of the government for 1985 and beyond, the government standards require that bumper weights on vehicles be substantially reduced. In order to accomplish this task, one method used is the creation of tubular bumpers. Such bumpers when formed of high-strength aircraft-type aluminum substantially satisfy the advance standards for energy-efficient motor vehicles while providing a rugged, durable and strong bumper for the motor vehicle for use both on the highways and in off the road use.

SUMMARY OF THE INVENTION AND OBJECTS

The instant invention may be fundamentally characterized as a towing system for vehicles with rear bumpers, which includes an anchor plate secured to the underside of the rear bumper of the vehicle and arranged so that the ends project rearwardly and forwardly from the bumper, a bracket having a channel therein with a pair of mounting flanges projecting laterally from the edges of the channel for mounting to the underside of the anchor plate, a tongue slideably mated to the channel of the bracket and removably secured to the bracket via a pin passed through a plurality of aligned holes in the bracket and the tongue, an end plate joined to the end of the tongue with a lip portion formed along the top edge of the end plate for engagement with the rearwardly projecting end of the anchor plate, and a ball hitch mounting element secured to the end plate with a hole therein for mounting a ball hitch therein for towing a vehicle.

It is an object of the present invention to provide a vehicle towing means which is removably installable to a vehicle having a rear bumper while still maintaining a clean, aesthetically pleasing appearance when the removable tongue is not installed in the channel portion of the bracket.

Another object of the present invention is to provide a means for ensuring structural integrity of a removable ball-trailer hitch towing tongue with respect to a tubular bumper mounted to the rear of the towing vehicle.

A yet still further and primary object of the instant invention is to provide a vehicle towing system for use with tubular bumpers which are mounted to the rear of the towing vehicle.

Other objects, features and characteristics of the present invention will become abundantly clear as the description of the invention disclosed herein is more fully developed hereinafter by way of the drawings, the description of the preferred embodiment of the invention, and the claims appended hereto.

BRIEF DESCRIPTION OF THE DRAWINGS

FIG. 1 is top view of the present invention with the tubular bumper being depicted by the phantom lines.

FIG. 2 is a side view of the instant invention wherein the tubular bumper is shown and illustrated by the use of phantom lines.

FIG. 3 is an exploded assembly view, shown in isometric form, of the invention disclosed herein.

DESCRIPTION OF THE PREFERRED EMBODIMENT OF THE INVENTION

With continued reference to the drawings herein, and with particular emphasis now on FIGS. 1 and 2, the present invention, towing system for vehicles with rear bumpers, is generally shown at 10, and includes an anchor plate means 19, bracket means 17, tongue means 16, end plate means 14, lip means 34, ball hitch mounting means 11, and gusset means 36.

The anchor plate means 19 is typically formed of a metal plate material and has a plurality of holes 28 drilled or punched through it. The anchor plate means 19 is weldedly secured to the bumper 22 and is further secured by the gusset means 36 weldedly secured to the bumper 22 and the anchor plate means 19. The bumper 22, in turn, is mounted typically to the rear of the towing vehicle (not shown).

It should now be noted that the bumper depicted at 22 is a tubular bumper and is preferred in the use of the present invention disclosed herein. However, it should be clearly understood that the invention is not in any way limited to use with a tubular bumper, but may conveniently and easily be adapted for use with a non-tubular bumper, as desired.

In the typical bumper installation, the bumper is mounted directly to the frame of the vehicle. In turn, the anchor plate means 19 is conveniently secured to the underside of the tubular bumper 22 by welding and further secured by welding of the gusset means 35. By such weldment, the anchor plate means 19 is effectively secured to the bumper 22 in a rugged and secure fashion and is designed to withstand the abuse such a system will most often encounter in use.

With special reference now to FIG. 3, there is further shown bracket means 17 formed of metal plate material which includes a channel 32, a pair of laterally arranged flanges 18, 31, a pair of holes 30 in the sidewalls of the channel 32, and a plurality of holes 29 in the flanges 18, 31. The bracket means 17 is typically secured to the bottom of the anchor plate means 19 by aligning the holes 28 in the anchor plate means 19 with the holes 29 in the flanges 18, 31. Thereafterwards, as depicted in FIGS. 1 and 2 of the Drawings, headed bolts 20 with threaded shanks are appropriately mated with nuts 21 and thereafter tightened to firmly secure the bracket means 17 to the anchor plate means 19. Once this is accomplished, the installation of that portion of the unit on the vehicle is completed. This is the condition in which the towing vehicle is found when not being used to tow another vehicle.

This installation results in an extremely clean and aesthetically pleasing appearance when the towing vehicle is viewed from the rear thereof.

In order to prepare the installation for towing purposes and thereby complete the towing package, the tongue means 16 is inserted into the channel 32 and arranged to be disposed beneath the anchor plate means 19. Thereafter, the tongue means 16 is moved so that the holes 33 in the tongue means 16 are in alignment with the holes 30 in the bracket means 17. Once this is accomplished, the pin 23 which has a bent end and an end which has a circular groove 24 thereabout, is inserted into the aligned holes 30, 33 and passed therethrough until the bent end prevents any further insertion therethrough.

A keeper clip 25, having an expanded, semi-circular portion 26 for insertion into and locking within the circular groove 24 of the pin 23. The clip 25, once inserted into the groove 24, prevents the pin 23 from being withdrawn from holes 30, 33, thereby "keeping" the pin 23 locked in position within the holes 30, 33.

A finger-gripping loop 27 is provided at the extremity of the keeper clip 25 to provide a proper surface for manually grasping the clip 25 for engagement and disengagement from the pin 23.

Once the tongue means 16 is installed in the channel 32 and the pin 23 inserted as previously indicated hereinbefore, the lip means 34 is operably disposed above the rearwardly most end of the anchor plate means 19 and in intimate contact therewith.

Further, the end plate means 14 is welded about the end of the tongue means 16 to form a cap to cover the end thereof and to provide a mounting surface for the ball hitch mounting means 11 thereby allowing the tang 12 to project rearwardly therefrom. A ball hitch mounting hole 35 is provided in the tang 12 to provide for mounting a ball hitch (not shown) thereto to provide a means for operably hitching up the vehicle to be towed behind the towing vehicle to which the invention 10 is secured as described hereinbefore.

It should be noted that the lip means 34 provides for a locking action which eliminates a substantial amount of stress due to the torque effects of the tongue means 16 on the fasteners (bolts 20 and nuts 21) via the bracket means 17; such fasteneres acting to secure the bracket means 17 to the anchor plate means 19. Without the use of the lip means 34 and its engagement with the end of the anchor plate means 19, a substantial amount of torqueing action is delivered to the fasteners indicated under towing conditions which having been found to exist under actual road and test conditions which have resulted in catastrophic failure of these elements.

While we have shown and described a preferred embodiment in accordance with the present invention, it is understood that the same is not limited thereto but is susceptible of numerous changes and modifications within the spirt and scope thereof and we therefore do not wish to be limited to the details shown and described herein but intend to cover all such changes and modifications as are encompassed by the scope of the appended claims.

We claim:

1. A towing system for vehicles with rear bumpers, comprising:
    (a) anchor plate means adapted for securement to the underside of said rear bumper of said vehicle so that the ends of said anchor plate means project forwardly and rearwardly from said bumper;
    (b) means for securing said anchor plate means to said rear bumper;
    (c) bracket means adapted for securement to said anchor plate means and having a channel therein with a pair of mounting flanges laterally disposed thereto, said flanges projecting from the top edges of said channel;
    (d) means for securing said bracket means to said anchor plate means;
    (e) tongue means adapted to be slideably engaged with said bracket means and disposed within said channel, said tongue means further having one end thereof projecting rearwardly from said bracket means;
    (f) means for securing said tongue means to said bracket means;
    (g) end plate and lip means, said end plate having a portion secured to said one end of said tongue means projecting rearwardly from said rear bumper and said lip means having a portion being disposed over said end of said anchor plate means projecting outwardly from said rear bumper in intimate abutting relationship therewith when said tongue means is fully engaged with said bracket means; and a
    (h) ball hitch mounting means attached to said end plate and lip means, said ball hitch mounting means including a rearwardly projecting tang portion having a hole therein for mounting a ball hitch therein for towing a vehicle.

2. The vehicle towing system of claim 1 further comprising a gusset member weldedly secured to the top of the anchor plate member and to the forward portion of the bumper.

3. The towing system for vehicles with rear bumpers of claim 1 wherein said anchor plate means and said means for securing said anchor plate means to said rear bumper comprises a metal plate welded to the underside of said rear bumper intermediate the ends of said plate.

4. The towing system for vehicles with rear bumpers of claim 1, wherein said bracket means comprises:
    (a) a body formed of metal having a U-shaped channel longitudinally arranged and disposed intermediately the ends thereof, said channel being oriented so that one end of said channel faces rearwardly of said vehicle; and
    (b) a pair of laterally-arranged flanges projecting from the top ends of said U-shaped channel.

5. The towing system for vehicles with rear bumpers of claim 4, wherein said means for securing said bracket means to said anchor plate means, comprises:
    (a) a metal plate having a plurality of holes in the forwardly projecting end thereof;
    (b) a pair of laterally-arranged flanges having a plurality of holes therethrough, said holes being operably alignable with the holes in said metal plate; and a
    (c) plurality of headed bolts with threaded shanks adapted to be passed through said aligned holes in said metal plate and said pair of flanges and mated with complementarily threaded nuts to secure said metal plate to said flanges, thereby securing said bracket means to said anchor plate means.

6. The towing system for vehicles with rear bumpers of claim 1, wherein said tongue means comprises a metal body the outside of which is contoured to be slideably mateable with said channel in said bracket means and disposed in intimate relationship thereto.

7. The towing system for vehicles with rear bumpers of claim 1, wherein said means for securing said tongue means to said bracket means, comprises:
    (a) a tongue means formed of a metal body the outside of which is contoured to be slideably mateable with said channel in said bracket means and disposed in intimate relationship thereto, said metal body having a hole disposed transversely therethrough intermediate the ends of said metal body;

(b) a bracket means formed of a metal body having a U-shaped channel longitudinally arranged and disposed intermediately the ends thereof, with a pair of oppositely facing holes therein alignable with said transversely disposed hole in the metal body of said tongue means;

(c) a metal pin mateable with said holes in said tongue means and said bracket means, one end of said pin being bent slightly to prevent the body of said pin from being passed totally through said holes, and the other end of said pin having a circular groove thereabout for mating to a keeper clip to prevent said pin body from being withdrawn inadvertently.

8. The towing system for vehicles with rear bumpers of claim 1 wherein said end plate and lip means is formed of metal and secured to the end of said tongue means by welding it thereto.

9. The towing system for vehicles with rear bumpers of claim 8, wherein said end plate portion of said end plate and lip means is co-extensively disposed over said one end of said tongue means.

10. The towing system for vehicles with rear bumpers of claim 1 wherein said ball hitch mounting means is formed of metal and is attached to said end plate and lip means by welding it thereto.

* * * * *